United States Patent [19]
Fushimi et al.

[11] Patent Number: 5,693,729
[45] Date of Patent: Dec. 2, 1997

[54] CATALYST FOR POLYMERIZATION OF OLEFIN AND PROCESS FOR THE PREPARATION OF OLEFIN POLYMER

[75] Inventors: Masaki Fushimi; Toshio Fujita, both of Oita, Japan

[73] Assignee: Showa Denko K.K., Tokyo, Japan

[21] Appl. No.: 368,615

[22] Filed: Jan. 4, 1995

Related U.S. Application Data

[62] Division of Ser. No. 112,341, Aug. 27, 1993, Pat. No. 5,407,883.

[51] Int. Cl.$^6$ .............................. C08F 4/649; C08F 10/00
[52] U.S. Cl. ............................ 526/125.3; 526/351
[58] Field of Search ........................... 526/125, 125.3

[56] References Cited

U.S. PATENT DOCUMENTS

| | | | |
|---|---|---|---|
| 4,525,469 | 6/1985 | Ueda et al. | 502/125 |
| 4,581,426 | 4/1986 | Asanuma et al. | 526/125 |
| 4,814,314 | 3/1989 | Matsuura et al. | 502/108 |
| 4,952,649 | 8/1990 | Kioka et al. | 526/125 |
| 4,990,478 | 2/1991 | Hoppin et al. | 526/125 |
| 5,147,839 | 9/1992 | Fujita et al. | 502/125 |
| 5,302,675 | 4/1994 | Sustic et al. | 526/125 |

FOREIGN PATENT DOCUMENTS

| | | | |
|---|---|---|---|
| 45977 | 2/1982 | European Pat. Off. | 526/125 |
| 2159523 | 12/1985 | United Kingdom | 526/125 |

OTHER PUBLICATIONS

Seppala et al, Makromol. Chem. 190, 2535–2550 (1989).

*Primary Examiner*—Edward J. Smith
*Attorney, Agent, or Firm*—Sughrue, Mion, Zinn, Macpeak & Seas, PLLC

[57] ABSTRACT

A catalyst for producing a polyolefin having a high melting point and a high stereoregularity, which comprises: (A) a solid catalyst component containing titanium, magnesium and halogen, (B) an organic aluminum compound, and (C) an organic silicon compound represented by Formula (1);

$$(R^1O)_3-Si-\underset{\underset{CH_3}{|}}{\overset{\overset{CH_3}{|}}{C}}-CH(R^2)(R^3) \quad (1)$$

wherein $R^1$, $R^2$ and $R^3$ each represents a $C_{1-3}$ hydrocarbon group.

10 Claims, No Drawings

CATALYST FOR POLYMERIZATION OF OLEFIN AND PROCESS FOR THE PREPARATION OF OLEFIN POLYMER

This is a divisional of application Ser. No. 08/112,341 filed Aug. 27, 1993, now U.S. Pat. No. 5,407,883.

FIELD OF THE INVENTION

The present invention relates to a process for preparation of a polyolefin which can provide a polyolefin having an extremely high melting point and a high stereoregularity in a high yield and also to a catalyst suitable for the process. More particularly, the present invention relates to an olefin polymerization catalyst comprising a Ziegler catalyst-on-carrier containing as an external donor a trialkoxysilane compound having an aliphatic substituent in which the carbon atom in the α-position adjacent to a silicon atom is a tertiary carbon atom and the carbon atom in the β-position is a tertiary carbon atom and also to a process for preparation of polyolefins in the presence of such an olefin polymerization catalyst.

BACKGROUND OF THE INVENTION

It has been heretofore known that the use of an organic silicon compound as a promotor component for a carried type Ziegler catalyst provides an improvement in the stereoregularity of the polymer thus produced.

Organic silicon compounds which have been heretofore proposed can be roughly divided into the following two groups:

(1) Dialkoxysilane compound (R$_2$Si(OMe)$_2$) (in which R represents an aromatic or aliphatic hydrocarbon group)

Examples of such dialkoxysilane compounds include diphenyldimethoxysilane compounds (as disclosed in JP-A-57-63310, 57-63311, 58-138708, 59-138708, 61-296006, 63-175008, 63-289004 (the term "JP-A" as used herein means an "unexamined published Japanese patent application")), diisobutyldimethoxysilane compounds (as disclosed in JP-A-62-18406, 63-258907, 2-70708, 2-173010, 3-33103), diisopropyldimethoxysilane compounds (as disclosed in JP-A-63-258907, 2-229807, 3-33102, 3-33103), dicyclopentyldimethoxysilane compounds (as disclosed in JP-A-2-229807), di-t-butyldimethoxysilane compounds (as disclosed in JP-A-2-70708, 2-229806, 3-33102), dicyclohexyldimethoxysilane compounds (as disclosed in JP-A-63-258907), t-butyl(t-butoxy)dimethoxysilane compounds (as disclosed in JP-A-3-119004), cyclohexylmethyldimethoxysilane compounds (as disclosed in JP-A-2-170803, 2-229807), cyclohexylethyldimethoxysilane compounds (as disclosed in JP-A-2-163104), and t-butylmethyldimethoxysilane compounds (as disclosed in JP-A-62-11705, 62-20507, 63-92615, 2-229807).

(2) Trialkoxysilane compound (RSi(OMe)$_3$) (in which R represents an aromatic or aliphatic hydrocarbon group)

Examples of such a trialkoxysilane compound include phenyltriethoxysilane compounds (as disclosed in JP-A-57-63311, 58-83006, 62-20507, 61-296006), ethyltriethoxysilane compounds (as disclosed in JP-A-57-63310), butyltriethoxysilane compounds (as disclosed in JP-A-2-170803), t-butyl-trimethoxysilane compounds (as disclosed in JP-A-63-11705, 63-92615, 63-258907, 3-33106, 3-33105, 2-70708), isobutyltrimethoxysilane compounds (as disclosed in JP-A-3-33106), t-butyltriethoxysilane compounds (as disclosed in JP-A-2-29807), and norbornanetrimethoxysilane compounds (as disclosed in JP-A-63-92615).

However, the use of such a dialkoxysilane compound has some disadvantages. For example, a diphenyldimethoxysilane compound has a benzene ring on a silicon atom. When decomposed, such a diphenyldimethoxysilane compound releases the harmful benzene which is then left in the polymer thus produced, causing health problems.

On the other hand, diisopropyldimethoxysilane, dicyclopentyldimethoxysilane, dicylcohexyldimethoxysilane, di-t-butyldimethoxysilane, t-butyl(t-butoxy)dimethoxysilane, t-butylmethyldimethoxysilane compounds, etc. have an aliphatic hydrocarbon group as a substituent on a silicon atom and thus cause no health problems. However, all these compounds, which have a bulky substituent, can hardly be synthesized and thus are extremely expensive. Further, the polymer thus obtained leaves much to be desired in stereoregularity and melting point. Diisobutyldimethoxysilane, cyclohexylmethyldimethoxysilane, cyclohexylethyldimethoxysilane compounds, etc. can be synthesized by a hydroxylation reaction and thus are inexpensive. However, the polymer thus produced exhibits a low stereoregularity. Therefore, these compounds cannot be practical.

These organic silicon compounds are obtained by introducing a substituent onto a silicon atom in the presence of an organic metal compound such as Grignard reagent. Accordingly, trialkoxysilane compounds can be generally easily synthesized and inexpensively supplied on an industrial basis as compared with dialkoxysilane compounds. However, trialkoxysilane compounds which have heretofore been used (e.g., phenyltriethoxysilane, ethyltriethoxysilane, butyltriethoxysilane, t-butyltrimethoxysilane, isobutyltrimethoxysilane, t-butyltriethoxysilane, norbornanetrimethoxysilane) cause a remarkable drop in the catalyst activity and thus are economically disadvantageous and cannot be substantially put into industrial use. In order to inhibit the drop in the catalyst activity with such a trimethoxy compound, it has been recently proposed to use such a trimethoxy compound in combination with a dimethoxysilane compound as disclosed in JP-A-2-70708, 3-33103, 3-33105, and 3-33106. However, all these approaches involve the reduction in stereoregularity. These approaches are also disadvantageous in that a plurality of tanks for storing respective organic silicon compounds and from which these organic silicon compounds are supplied to production plants are needed.

SUMMARY OF THE INVENTION

It is therefore an object of the present invention to give a solution to the technical problems in the process for producing a polyolefin in the presence of a carried type Ziegler catalyst and hence provide a process for preparation of an olefin polymer having a high activity, a high stereoregularity and a high melting point.

The foregoing object of the present invention will become more apparent from the following detailed description and examples.

The inventors made extensive studies on promotors for carried type Ziegler catalysts, particularly extrnal donors. As a result, it was found that the foregoing object of the present invention can be accomplished by a catalyst for polymerization of olefin for use in the process for preparation of an olefin polymer, which comprises:

Component (A): a solid catalyst component containing titanium, magnesium and halogen as essential components;

Component (B): an organoaluminum compound; and

Component (C): an organosilicon compound represented by formula (1):

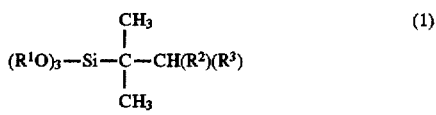

(1)

wherein $R^1$, $R^2$ and $R^3$ each represents a $C_{1-3}$ hydrocarbon group. Accordingly, it was found that such an olefin polymerization catalyst can provide practically excellent polymers. Thus, the present invention was worked out.

The effects of the present invention can be attained only when an organosilicon compound having a specific structure (specifically, trialkoxysilane compound containing an aliphatic substituent in which the carbon atom in the α-position adjacent to a silicon atom is a tertiary carbon atom and the carbon atom in the β-position is a tertiary carbon atom) is used as a promotor, particularly an external donor. It was an unexpected fact that an organosilicon compound having such a structure has such effects. Heretofore, studies have been made focusing on the structure of the carbon atom in the α-position adjacent to the silicon atom in an organosilicon compound (JP-A-62-11705, 62-18406, 63-92615, and 3-119004). The present invention made it clear that the structure of the carbon atom in the α-position adjacent to the silicon atom in an organic silicon compound as well as that in the β-position is extremely important for the preparation of an olefin polymer having a high melting point.

Further, an example of an extremely useful organosilicon compound in the present invention is thexyltrimethoxysilane. Thexyltrichlorosilane, which is a starting material of thexyltrimethoxysilane, can be synthesized easily in a constant and high yield under milder conditions by an industrially known method which comprises the reaction of trichlorosilane and 2,3-dimethyl-2-butene in the presence of a catalyst (as disclosed in JP-A-4-66588) and is thus useful in the industrial application.

DETAILED DESCRIPTION OF THE INVENTION

The present invention will be further described hereinafter.

Examples of magnesium compounds to be used in preparation of component (A) of the present invention include halogenated magnesium such as magnesium chloride and magnesium bromide; alkoxy magnesium such as ethoxy magnesium and isopropoxy magnesium; carboxylate of magnesium such as magnesium laurate and magnesium stearate; and alkyl magnesium such as butylethyl magnesium. The magnesium compound may comprise a mixture of two or more of these compounds. Of these, a halogenated magnesium is preferably used and the halogen is preferably a chlorine atom. Alternately, a compound which forms a halogenated magnesium may be used.

Examples of titanium compounds to be used in preparation of component (A) of the present invention include halogenated titanium such as titanium tetrachloride and titanium trichloride; titanium alkoxide such as titanium butoxide and titanium ethoxide; and alkoxy titanium halide such as phenoxy titanium chloride. The titanium compound may comprise a mixture of two or more of these compounds.

Halogen-containing compound to be used in preparation of component (A) of the present invention has fluorine, chlorine, bromine or iodine, preferably chlorine, as a halogen. Typical examples of such a halogen-containing compound include halogenated titanium such as titanium tetrachloride and titanium tetrabromide; halogenated silicon such as silicon tetrachloride and silicon tetrabromide; and halogenated phosphorus such as phosphorus trichloride and phosphorus pentachloride. Halogenated hydrocarbons, halogen molecules or halogenated hydro-acids (e.g., HCl, HBr, HI) may be used depending on the preparation method. When the halogen-containing compound is the same as the above mentioned titanium or magnesium compound, it may be omitted.

In preparation of the solid catalyst (component (A)) to be used in the present invention, various electron donors (internal donors) is preferably added to the system. Examples of such electron donors include oxygen-containing compounds and nitrogen-containing compounds. Specific examples of such compounds include (a) $C_{1-20}$ alcohols such as methanol, ethanol, propanol, butanol, heptanol, hexanol, octanol, dodecanol, octadecyl alcohol, 2-ethyl-hexyl alcohol, benzyl alcohol, cumyl alcohol, diphenyl methanol and triphenyl methanol, (b) $C_{6-25}$ phenols which may contain an alkyl substituent, such as phenol, cresol, ethylphenol, propylphenol, cumylphenol, nonylphenol and naphthol, (c) $C_{3-15}$ ketones such as acetone, methyl ethyl ketone, methyl isobutyl ketone, acetophenone and cylohexanone, (d) $C_{2-15}$ aldehydes such as acetaldehyde, propionoaldehyde, tolualdehyde and naphthoaldehyde, (e) $C_{2-20}$ organic esters such as methyl formate, ethyl formate, methyl acetate, ethyl acetate, propyl acetate, octyl acetate, cyclohexyl acetate, methyl cellosolve acetate, cellosolve acetate, ethyl propionate, methyl n-butyrate, methyl isobutyrate, ethyl isobutyrate, isopropyl isobutyrate, ethyl valerate, butyl valerate, ethyl stearate, methyl chloroacetate, ethyl dichloroacetate, methyl methacrylate, ethyl methacrylate, ethyl crotonate, ethyl cyclohexanecarboxylate, methyl phenylacetate, methyl phenylbutyrate, propyl phenylacetate, propyl phenylbutyrate, methyl benzoate, ethyl benzoate, propyl benzoate, butyl benzoate, octyl benzoate, cyclohexyl benzoate, phenyl benzoate, benzyl benzoate, cellosolve benzoate, methyl toluate, ethyl toluate, amyl toluate, ethyl ethylbenzoate, methyl anisate, ethyl anisate, ethyl ethoxybenzoate, diethyl phthalate, diisobutyl phthalate, diheptyl phthalate, dineopentyl phthalate, γ-butyrolactone, γ-valerolactone, coumarine, phthalide, diethyl carbonate, methyl orthoformate, and ethyl orthoformate, (f) alkoxy acid esters such as methyl methoxyacetate, ethyl methoxyacetate, butyl methoxyacetate, phenyl methoxyacetate, methyl ethoxyacetate, ethyl ethoxyacetate, butyl ethoxyacetate, phenyl ethoxyacetate, ethyl n-propoxyacetate, ethyl i-propoxyacetate, methyl n-butoxyacetate, ethyl i-butoxyacetate, ethyl n-hexyloxyacetate, octyl sec-hexyloxyacetate, methyl 2-methylcyclohexyloxyacetate, methyl 3-methoxypropionate, ethyl 3-methoxypropionate, butyl 3-methoxypropionate, ethyl 3-ethoxypropionate, butyl 3-ethoxypropionate, n-octyl 3-ethoxypropionate, dodecyl 3-ethoxypropionate, pentamethylphenyl 3-ethoxypropionate, ethyl 3-(i-propoxy)propionate, butyl 3-(i-propoxy)propionate, allyl 3-(n-propoxy)propionate, cyclohexyl 3-(n-butoxy)propionate, ethyl 3-neopentyloxypropionate, butyl 3-(n-octyloxy)propionate, octyl 3-(2,6-dimethyldecyloxy)propionate, ethyl 4-ethoxyacetate, cyclohexyl 4-ethoxybutyrate, octyl 5-(n-propoxy)valerate, ethyl 12-ethoxylaurate, ethyl 3-(1-indenoxy)propionate, methyl 3-methoxyacrylate, methyl 2-ethoxyacrylate, ethyl 3-phenoxyacrylate, ethyl 2-methoxypropionate, n-butyl 2-(i-propoxy)butyrate, methyl 2-ethoxyisobutyrate, phenyl 2-cyclohexyloxyisovalerate, butyl 2-ethoxy-2-phenylacetate, allyl 3-neopentyloxybutyrate, methyl 3-ethoxy-3-(o-methylphenyl)propionate, ethyl 3-ethoxy-2-

(o-methylphenyl)propionate, ethyl 4-ethoxy-2-methyl-1-naphthylnonanate, ethyl 2-methoxycyclopentanecarboxylate, butyl 2-ethoxycyclohexanecarboxylate, isopropyl 3-(ethoxymethyl)tetralin-2-acetate, ethyl 8-butoxy-decalin-1-carboxylate, methyl 3-ethoxynorbornane-2-carboxylate, methyl 2-(phenoxy)acetate, ethyl 3-(p-cresoxy)propionate, methyl 4-(2-naphthoxy)butyrate, butyl 5-carbaloxyvalerate, methyl 2-phenoxypropionate, ethyl 3-(4-methylphenoxy)-2-phenylpropionate, ethyl 2-phenoxycyclohexanecarboxylate, ethyl thiophene-3-oxyacetate, ethyl 2-(2-picolinoxymethyl)-cyclohexanecarboxylate, and ethyl 3-furfuryloxypropionate, (g) ketonic acid ester such as methyl acetylacetate, ethyl acetylacetate, butyl acetylacetate, methyl propionylacetate, phenyl acetylacetate, ethyl propionylacetate, phenyl propionylacetate, butyl propionylacetate, ethyl butyrylacetate, ethyl i-butanoylacetate, ethyl pentanoylacetate, methyl 3-acetylpropionate, ethyl 3-acetylpropionate, butyl 3-acetylpropionate, ethyl 3-propionylpropionate, butyl 3-propionylpropionate, n-octyl 3-propionylpropionate, dodecyl 3-propionylpropionate, pentamethylphenyl 3-propionylpropionate, ethyl 3-(i-propionyl)propionate, butyl 3-(i-propionyl)propionate, allyl 3-(i-propionyl)propionate, cyclohexyl 3-(i-propionyl) propionate, ethyl 3-neopentanoylpropionate, butyl 3-n-laurylpropionate, methyl 3-(2,6-dimethylhexanoyl) propionate, ethyl 4-propionylbutyrate, cyclohexyl 4-propionylbutyrate, octyl 5-butyrylvalerate, ethyl 12-butyryllaurate, methyl 3-acetylacrylate, methyl 2-acetylacrylate, ethyl 3-benzoylpropionate, methyl 3-benzoylpropionate, ethyl 3-methylbenzoylpropionate, butyl 3-toluylbutyrate, ethyl o-benzoylbenzoate, ethyl m-benzoylbenzoate, ethyl p-benzoylbenzoate, butyl o-toluylbenzoate, ethyl o-toluylbenzoate, ethyl m-toluylbenzoate, ethyl p-toluylbenzoate, ethyl o-(2,4,6-trimethylbenzoyl)benzoate, ethyl m-(2,4,6-trimethylbenzoyl)benzoate, ethyl p-(2,4,6-trimethylbenzoyl)benzoate, ethyl o-ethylbenzoylbenzoate, ethyl o-acetylbenzoate, ethyl o-propionylbenzoate, ethyl o-laurylbenzoate, ethyl o-cyclohexanoylbenzoate, and ethyl o-dodecylbenzoate, (h) inorganic esters such as methyl borate, butyl titanate, butyl phosphate, diethyl phosphite, and di(2-phenylphenyl)phosphorochloridate, (i) $C_{2-25}$ ethers such as methyl ether, ethyl ether, isopropyl ether, butyl ether, amyl ether, tetrahydrofuran anisole, diphenyl ether, ethylene glycol diethyl ether, ethylene glycol diphenyl ether, and 2,2-dimethoxypropane, (j) $C_{2-20}$ acid amides such as acetic amide, benzoic amide, and toluic amide, (k) $C_{2-20}$ acid halides such as acetyl chloride, benzoyl chloride, toluic chloride, anisic chloride, phthaloyl chloride, and phthaloyl isochloride, (1) $C_{2-20}$ acid anhydrides such as acetic anhydride and phthalic anhydride, (m) $C_{1-20}$ amines such as monomethylamine, monoethylamine, diethylamine, tributylamine, piperidine, tribenzylamine, aniline, pyridine, picoline and tetramethylethylenediamine, (n) $C_{2-20}$ nitriles such as acetonitrile, benzonitrile and trinitrile, (o) $C_{2-20}$ thiols such as ethylthio alcohol, butylthio alcohol and phenylthiol, (P) $C_{4-25}$ thioethers such as diethylthioether and diphenylthioether, (q) $C_{2-20}$ sulfuric esters such as dimethyl sulfate and diethyl sulfate, (r) $C_{2-20}$ sulfonic acids such as phenylmethylsulfon and diphenylsulfon, and (s) $C_{2-24}$ silicon-containing compounds such as phenyltrimethoxysilane, phenyltriethoxysilane, phenyltributoxysilane, vinyltriethoxysilane, diphenyldiethoxysilane, phenyldimethylmethoxysilane, phenyldimethylethoxysilane, triphenylmethoxysilane, hexamethyldisiloxane, octamethyltrisiloxane, trimethylsilanol, phenyldimethylsilanol, triphenylsilanol, diphenylsilanediol and silicic lower alkyl (particularly ethyl silicate). Two or more of these electron donative compounds may be used in combination. Preferred among these compounds are organic esters, alkoxy acid esters, and ketonic acid esters.

The process for preparation of the catalyst of the present invention is not specifically limited. Examples of the process include a process which comprises bringing a halogenated magnesium, a halogenated titanium and the foregoing electron donative compounds into contact with each other by grinding or by dispersing or dissolving in a solvent to obtain a catalyst component; a process which comprises complexing a halogenated magnesium with an organic or inorganic compound (which may include the foregoing electron donative compounds), and then bringing the complex into contact with a halogenated titanium or a complex thereof with the foregoing electron donative compounds to obtain a catalyst component; a process which comprises complexing a halogenated magnesium with an organic or inorganic compound (which may include the foregoing electron donative compounds), and then bringing the complex into contact with the foregoing electron donative compound and a titanium compound in sequence (order may be reversed) to obtain a catalyst component; and a process which comprises bringing a magnesium compound (which may optionally include a titanium compound) into contact with the foregoing electron donative compounds, and bringing the material into contact with a titanium compound or halogenating the material simultaneously or at the subsequent stage to obtain a catalyst component (the titanium compound must be used any stage).

The foregoing catalyst component may also be prepared by supporting these materials on a material commonly used as a catalyst carrier, such as silica and alumina or impregnating such a carrier with these materials.

The relationship between the various components in component (A) in content is arbitrary so far as the effects of the present invention are recognized. In general, the following ranges are preferred. The molar ratio of Mg to Ti is 0.1/1 to 1,000/1, preferably 2/1 to 200/1. The molar ratio of halogen to Ti is 1/1 to 100/1. The molar ratio of an electron donative compound, if any used, to Ti is 10/1 or less, preferably 0.1/1 to 5/1.

The average grain diameter of the solid catalyst component to be used in the present invention is arbitrary so far as the effects of the present invention are recognized but is normally in the range of 0.1 to 200 μm, preferably 1 to 100 μm, more preferably 10 to 100 μm.

The organoaluminum compound (component (B)) according to the present invention is typically represented by formula (2), (3), (4) or (5):

  (2)

  (3)

  (4)

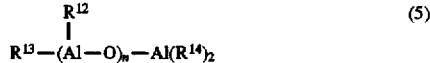  (5)

wherein $R^4$, $R^5$ and $R^6$, which may be the same or different, each represents a hydrogen, a halogen atom, or an alkyl group having up to 12 carbon atoms and preferably 1 to 8 carbon atoms, provided that at least one of $R^4$, $R^5$ and $R^6$ is an alkyl group; $R^7$, $R^8$, $R^9$, $R^{10}$, $R^{11}$, $R^{12}$, $R^{13}$, and $R^{14}$, which may be the same or different, each represents an alkyl group having up to 12 carbon atoms, preferably 1 to 8 carbon atoms; and n represents an integer of 1 or more.

Typical examples of the organoaluminum compound represented by formula (2) include trialkyl aluminum such as trimethyl aluminum, triethyl aluminum, tripropyl aluminum, tributyl alumina, trihexyl aluminum and trioctyl aluminum; alkyl aluminum hydride such as diethyl aluminum hydride and diisobutyl aluminum hydride; and alkyl aluminum halide such as diethyl aluminum chloride, diethyl aluminum bromide, ethyl aluminum sesqui-chloride and ethyl aluminum sesqui-chloride.

Typical among the organoaluminum compounds represented by formula (3) are alkyldialmoxanes such as tetraethyldialmoxane and tetrabutyldialmoxane.

Formula (4) represents an aluminoxane, which is a polymer of aluminum compounds. In formula (4), $R^{11}$, $R^{12}$, $R^{13}$ and $R^{14}$, each is methyl, ethyl, propyl, butyl, benzyl or the like, preferably methyl or ethyl. The suffix n is preferably from 1 to 10.

Among these organoaluminum compounds, trialkyl aluminum, alkyl aluminum hydride, and alkyl almoxanes are particularly preferred because they provide desirable results.

In the polymerization of an olefin, the amount of the organoaluminum compound to be charged into the polymerization system is normally in the range of $10^{-4}$ mmol/l or more, preferably $10^{-2}$ mmol/l or more. The molar proportion of the organoaluminum compound to the titanium atom in the solid catalyst component is normally in the range of 0.5/1 or more, preferably 2/1 or more, particularly 10/1 or more. If the amount of the organoaluminum compound to be used is too small, it causes a drastic drop in the polymerization activity. When the amount of the organoaluminum compound to be charged into the polymerization system is 20 mmol/l or more and the molar proportion of the organoaluminum compound to the titanium atom is 1,000/1 or more, the catalytic properties cannot be further enhanced even if these values are further increased.

The compound of component (C) to be used in the present invention is an organosilicon compound having the structure represented by formula (1):

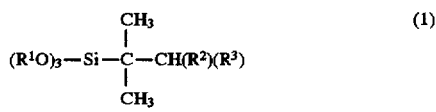

wherein $R^1$, $R^2$ and $R^3$ each represents a $C_{1-3}$ hydrocarbon group, preferably a $C_{1-3}$ alkyl group (e.g., methyl and ethyl).

Specific examples of such an organosilicon compound include thexyltrimethoxysilane (2,3-dimethyl-2-trimethoxysilyl-butane), thexyltriethoxysilane, thexyltripropoxysilane, thexyltriisopropoxysilane, 2,3-dimethyl-2-trimethoxysilyl-pentane, 2,3-dimethyl-2-triethoxysilyl-pentane, 2,3-dimethyl-2-tripropoxysilyl-pentane, 2,3-dimethyl-2-triisopropoxysilyl-pentane, 2-methyl-3-ethyl-2-trimethoxysilyl-pentane, 2-methyl-3-ethyl-2-triethoxysilyl-pentane, 2-methyl-3-ethyl-2-tripropoxysilyl-pentane, 2-methyl-3-ethyl-2-triisopropoxysilyl-pentane, 2,3,4-trimethyl-2-trimethoxysilyl-pentane, 2,3,4-trimethyl-2-triethoxysilylpentane, 2,3,4-trimethyl-2-tripropoxysilyl-pentane, 2,3,4 -trimethyl-2-triisopropoxysilyl-pentane, 2,3-dimethyl-2-trimethoxysilyl-hexane, 2,3-dimethyl-2-triethoxysilyl-hexane, 2,3-dimethyl-2-tripropoxysilyl-hexane, 2,3-dimethyl-2-triisopropoxysilyl-hexane, 2,4-dimethyl-3-ethyl-2-trimethoxysilyl-pentane, 2,4-dimethyl-3-ethyl-2-triethoxysilyl-pentane, 2,4-dimethyl-3-ethyl-2-tripropoxysilyl-pentane, 2,4-dimethyl-3-ethyl-2-triisopropoxysilyl-pentane, 2,4-dimethyl-3-isopropyl-2-trimethoxysilyl-pentane, 2,4-dimethyl-3-isopropyl-2-triethoxysilyl-pentane, 2,4-dimethyl-3-isopropyl-2-propoxysilyl-pentane, and 2,4-dimethyl-3-isopropyl-2-isopropoxysilyl-pentane.

Particularly preferred among these organosilicon compounds is thexyltrimethoxysilane.

The molar ratio of component (C) to component (B) is in the range of 0.001/1 to 5/1, preferably 0.01/1 to 1/1.

As the olefin to be polymerized there may be used an olefin having up to 12 carbon atoms. Typical examples of olefin include ethylene, propylene, butene-1,4-methylpentene-1, hexene-1, and octene-1. The present invention is advantageous for stereospecific polymerization of an α-olefin having 3 or more carbon atoms, such as a mixure of these olefins and a mixture thereof with ethylene. The present invention is particularly advantageous for stereospecific polymerization of propylene or a mixture of propylene and up to 20 mol % of ethylene or a higher α-olefin (i.e., having 4 or more carbon atoms), and most advantageous for homopolymerization of propylene. According to the process of the present invention, a propylene polymer having a melting point of 164° C. or higher and a xylene-soluble content (% XSRT as defined below) at room temperature of 2.0% or less can be obtained.

In carting out the polymerization, the solid catalyst component, the organoaluminum compound, and the organosilicon compound may be separately introduced into the polymerization vessel. Alternately, Two or all of these components may be previously mixed. In a typical preferred method, an inert solvent as disclosed below, an organoaluminum compound and an organosilicon compound are charged into a dropping funnel in which the air therein has been replaced by nitrogen, mixed, and then allowed to stand for over a predetermined period of time (about 1 minute or more). The mixture was brought into contact with a solid catalyst component, allowed to stand for over a predetermined period of time (about 1 minute or more), and then charged into a polymerization vessel. Examples of the inert solvent include alkane and cycloalkane such as pentane, hexane, heptane, n-octane, isooctane, cyclohexane and methylcyclohexane; alkyl-aromatic hydrocarbon such as toluene, xylene, ethylbenzene, isopropylbenzene, ethyltoluene, n-propylbenzene, diethylbenzene and mono- or dialkylnaphthalene; halogenated or hydrogenated aromatic hydrocarbon such as chlorobenzene, chloronaphthalene, orthodichlorobenzene, tetrahydronaphthalene and decahydronaphthalene; high molecular liquid paraffin, and mixture thereof.

The olefin polymerization according to the present invention is effected at a monomer pressure of not lower than the atmospheric pressure. In the gas phase polymerization, the monomer pressure must not fall below its vapor pressure at the polymerizing temperature and is normally in the range of about 20 to 600 PSI.

The polymerization may be effected in an inert solvent, liquid monomer (olefin) or gas phase. Further, the polymerization may be effected in a batch-wise process, semi-continuous process or continuous process. Moreover, the polymerization may be effected in two stages under different reaction conditions.

In order to obtain a polymer having a practicable melt flow, a molecular weight adjustor (generally hydrogen) may be present in the system.

The polymerizing time in the batch-wise process is normally in the range of 30 minutes to several hours. In the case of the continuous process, the same polymerizing time is taken as an average residence time. In the autoclave type reaction, the polymerizing time is typically in the range of about 1 hour to 4 hours.

In the slurry process, the polymerizing time is preferably in the range of 30 minutes to several hours.

Examples of diluent solvents suitable for the slurry process include alakane and cycloalkane such as pentane, hexane, heptane, n-octane, isooctane, cyclohexane and methylcyclohexane; alkylaromatic hydrocarbon such as toluene, xylene, ethylbenzene, isopropylbenzene, ethyltoluene, n-propylbenzene, diethylbenzene and mono- or dialkylnaphthalene; halogenated or hydrogenated aromatic hydrocarbon such as chlorobenzene, chloronaphthalene, o-dichlorobenzene, tetrahydronaphthalene and decahydronaphthalene, high molecular liquid paraffin, mixture thereof, and other known diluent solvents.

In the gas phase polymerization process for which the present invention is useful, an agitated bed reactor, fluidized bed reactor system, etc. may be used. In a typical gas phase olefin polymerization reactor system, an olefin monomer and catalyst components can be added to the system. This system comprises a reaction vessel equipped with an agitator. The catalyst components may be charged into the reaction vessel simultaneously or separately through one or more valve regulators. In this gas phase olefin polymerizing method, the olefin monomer is typically supplied into the reactor through a gas recycling system in which unreacted monomer exhaused as exhaust gas and fresh monomer to be supplied are mixed and then pressed into the reaction vessel.

The deactivation of the catalyst of the present invention for the completion or suspension of the polymerization, though not generally needed, can be accomplished by bringing the system into contact with water, alcohol or acetone, which is known as a catalyst poison, or other suitable catalyst deactivators.

The polymerizing temperature is normally in the range of −10° C. to 180° C., preferably 20° C. to 100° C., more preferably 50° C. to 80° C., for excellent catalytic properties and high production speed.

Prepolymerization, though not necessarily needed, is preferably effected. In the prepolymerization, the foregoing solid catalyst component (A) is normally used in combination at least a part of the foregoing organoaluminum compound (B). In this case, an organosilicon compound or an acetal compound may be present in the system. Such an organosilicon compound is not limited to the compounds used as the foregoing catalyst component (C). The concentration of the solid catalyst component (A) in the prepolymerization process is preferably in the range of 0.01 to 200 mmol per 1 of inert hydrocarbon solvent as disclosed below as calculated in terms of titanium atom. The amount of the organoaluminum component (B) may be such that a polymer is produced in an amount of 0.1 to 500 g, preferably 0.1 to 300 g per g of solid catalyst component (A). The prepolymerization is preferably effected under mild conditions with an inert hydrocarbon solvent having an olefin and the foregoing catalyst component added thereto. Specific examples of such an inert hydrocarbon solvent include aliphatic hydrocarbon such as propane, butane, pentane, hexane, heptane, octane, decane, dodecane and kerosine; alicyclic hydrocarbon such as cyclopentane, cyclohexane and methylcyclopentane; aromatic hydrocarbon such as benzene, toluene and xylene; halogenated hydrocarbon such as ethylene chloride and chlorobenzene; and mixture thereof. Particularly preferred among these inert hydrocarbon solvents is aliphatic hydrocarbon. The olefin to be used in the prepolymerization process may be the same as or different from that to be used in the main polymerization as described below. The reaction temperature in the prepolymerization process may be such that the resulting prepolymer is not substantially dissolved in an inert hydrocarbon solvent. It is normally in the range of about −10° C. to 100° C., preferably about −10° C. to 80° C. In the prepolymerization process, a molecular weight adjustor such as hydrogen may be used. The prepolymerization may be effected batch-wise or continuously.

The polymerization controlling method, post-treatment method, etc. are not specifically limited in the catalyst of the present invention. All known methods can be applied.

The present invention will be further described in the following examples.

The xylene soluble content (%) of the polymer at room temperature (% XSRT) was determined as follows. Specifically, 2 g of the polymer was dissolved in 200 ml of xylene at a temperature of 135° C. The solution was then allowed to cool to room temperature (25° C.). The polymer thus deposited was then filtered off. The solvent was then distilled off the filtrate by means of a rotary evaporator. The material was dried, and the resulting residue was then measured. % XSRT was calculated by the following equation:

$$\% \, XSRT = \frac{\text{Amount (g) of Residue} \times 100}{\text{Amount (g) of Polymer Specimen}}$$

The insoluble residue substantially corresponds to an isotactic index of the polymer, and the lower % XSRT value implies the higher stereoregularity.

The melting point (Tmp °C.) of the polymer according to the present invention was determined from the fusion peak top during the secondary temperature rise (20° C./min.) by DSC-7 available from Perkin Elmer. The higher Tmp implies a polymer of better physical properties.

In the Examples and Comparative Examples, the melt index under a load of 2.16 kg (i.e., FLFR) was measured in accordance with JIS K-6758-1968. The higher MFR implies a polymer of a lower molecular weight.

The initial flexural modulus (FM) was measured in accordance with ASTM-D-790-66. The higher FM implies a polymer of better physical properties.

In the Examples and Comparative Examples, all the compounds used in the preparation and polymerization of the solid catalyst component (organic solvent, olefin, hydrogen, titanium compound, magnesium compound, silicon compound, etc.) were substantially free of water content.

The preparation of the solid catalyst component and the polymerization were effected in a substantially water-free nitrogen atmosphere.

EXAMPLE 1

Preparation of solid catalyst component (A)

1.71 g of anhydrous magnesium chloride, 9 ml of decane and 8.4 ml of 2-ethylhexyl alcohol were allowed to undergo reaction under heating at a temperature of 130° C. for 3 hours to make a uniform solution. To the solution was then added 0.39 g of phthalic anhydride. The solution was stirred at a temperature of 130° C. for 2 hours to dissolve the phthalic anhydride in the uniform solution. The uniform solution thus obtained was allowed to cool to room temperature. The solution was then added dropwise to 72 ml of titanium tetrachloride which had been kept at a temperature of −20° C. in 1 hour. After completion of the dropwise addition, the temperature of the solution was raised to 110° C. in 4 hours. When the temperature of the solution reached 110° C., 0.96 g of diisobutyl phthalate was added to the solution. The solution was then kept at the same temperature under stirring for 2 hours. After 2 hours of reaction, the solution was then filtered under heating to withdraw a solid content. The solid content was then resuspended in 72 ml of TiCl$_4$. The suspension was then allowed to undergo reaction under heating at a temperature of 110° C. for 2 hours. After completion of the reaction, the material was then filtered under heating to withdraw a solid content. The solid content was then thoroughly washed with decane and hexane until no free titanium compounds were detected in the wash liquid. The solid content was then dried under reduced pressure.

11

Polymerization

Into a 1.5-l stainless steel autoclave were charged 4.8 mg of the solid component thus prepared, 5.4 mg of thexyltrimethoxysilane (0.8 ml of 0.1 mol/l hexane solution thereof), and 91 mg of triethyl aluminum (0.8 ml of 1 mol/l hexane solution thereof). To the material were then added 340 g of propylene and 0.03 g of hydrogen.

The autoclave was heated so that the internal temperature thereof was kept at 80° C. After 1 hour, the internal gas was then released to complete the polymerization. As a result, 160 g of a polypropylene powder was obtained. The product exhibited MFR of 2.5 g/10 min., Tmp of 164.9° C. XSRT of 1.40%, and FM of 17,000 kg/cm$^2$.

COMPARATIVE EXAMPLES 1–2 AND EXAMPLES 2–4

Catalysts were prepared and polymerization was effected in the same manner as in Example 1 except that the kind and amount of the catalyst component (C) used were altered as shown in Table 1.

12 thexyltrimethoxysilane, and 91 mg of triethyl aluminum. To the material were then added 340 g of propylene and 0.03 g of hydrogen.

The autoclave was heated so that the internal temperature thereof was kept at 75° C. After 1 hour, the internal gas was then released to complete the polymerization. As a result, 152 g of a polypropylene powder was obtained. The product exhibited MFR of 4.0 g/10 min., Tmp of 165.6° C., XSRT of 1.90 %, and FM of 16,600 kg/cm$^2$.

COMPARATIVE EXAMPLES 3–4 AND EXAMPLES 6–8

Catalysts were prepared and polymerization was effected in the same manner as in Example 5 except that the kind and amount of the catalyst component (C) used were altered as shown in Table 2.

TABLE 1

| Example and Comparative Example | Component (C) | Used amount (mg) of Component (C) | Caralyst activity (g/g h) | XSRT (%) | Tmp (degree) | MFR (g/10 min) | FM (kg/cm$^2$) |
|---|---|---|---|---|---|---|---|
| Ex.2 | Thexyltrimethoxysilane | 2.7 | 35,000 | 1.6 | 164.2 | 4.0 | 16,800 |
| Ex.3 | Thexyltrimethoxysilane | 10.8 | 28,500 | 0.7 | 165.8 | 2.1 | 17,300 |
| Ex.4 | Thexyltrimethoxysilane | 16.2 | 27,100 | 0.7 | 166.0 | 2.6 | 17,400 |
| Comp.Ex.1 | t-Butyltrimethoxysilane | 14.8 | 13,800 | 1.2 | 162.6 | 1.5 | 16,600 |
| Comp.Ex.2 | Dicyclopentyldimethoxysilane | 17.2 | 22,000 | 1.5 | 163.1 | 3.0 | 15,900 |

EXAMPLE 5

Preparation of solid Ti catalyst component (A)

Into a 300-ml round flask which had been thoroughly dried were charged 5 g of diethoxy magnesium, 1.22 g of

TABLE 2

| Example and Comparative Example | Component (C) | Used amount (mg) of Component (C) | Caralyst activity (g/g h) | XSRT (%) | Tmp (degree) | MFR (g/10 min) | FM (kg/cm$^2$) |
|---|---|---|---|---|---|---|---|
| Ex.6 | Thexyltrimethoxysilane | 2.7 | 44,000 | 1.9 | 164.9 | 5.1 | 16,100 |
| Ex.7 | Thexyltrimethoxysilane | 10.8 | 36,000 | 1.8 | 165.9 | 2.9 | 16,600 |
| Ex.8 | Thexyltrimethoxysilane | 16.2 | 35,500 | 1.8 | 165.6 | 2.8 | 16,900 |
| Comp.Ex.3 | t-Butyltrimethoxysilane | 14.8 | 19,700 | 2.3 | 164.1 | 2.1 | 16,000 |
| Comp.Ex.4 | Dicyclopentyldimethoxysilane | 17.2 | 25,300 | 2.2 | 164.0 | 2.6 | 15,800 | ethyl 3-ethoxy-2-phenylpropionate, and 25 ml of methylene chloride in a stream of nitrogen. The material was then stirred under reflux for 1 hour. The suspension was then pressed into 200 ml of TiCl$_4$ at room temperature. The material was gradually heated to a temperature of 110° C. where it was then allowed to undergo reaction under stirring for 2 hours. After completion of the reaction, the resulting solid was withdrawn by filtration, and then washed with 200 ml of n-decane three times at a temperature of 110° C. To the material was added 200 ml of TiCl$_4$. The material was then allowed to undergo reaction at a temperature of 120° C. for 2 hours. After completion of the reaction, the solid material thus deposited was withdrawn by filtration, washed with 200 ml of n-decane three times, and then washed with n-hexane at room temperature until no chlorine ions were detected.

Polymerization

Into a 1.5-l stainless steel autoclave were charged 4.0 mg of the solid coomponent thus prepared, 5.4 mg of

EXAMPLE 9

Preparation of solid catalyst component (A)

1.71 g of anhydrous magnesium chloride, 9 ml of decane and 8.4 ml of 2-ethylhexyl alcohol were allowed to undergo reaction under heating at a temperature of 130° C. for 2 hours to make a uniform solution. To the solution was then added 0.39 g of phthalic anhydride. The solution was stirred at a temperature of 130° C. for 1 hour to dissolve the phthalic anhydride in the uniform solution. The uniform solution thus obtained was allowed to cool to room temperature. The solution was then added dropwise to 72 ml of titanium tetrachloride which had been kept at a temperature of −20° C. in 1 hour. After completion of the dropwise addition, the temperature of the solution was raised to 110° C. in 4 hours. When the temperature of the solution reached 110° C., 1.01 g of ethyl 3-benzoylpropionate was added to the solution. The solution was then kept at the same temperature under stirring for 2 hours. After 2 hours of reaction, the solution was then filtered under heating to withdraw a solid content. The solid content was then resuspended in 72 ml of TiCl$_4$. The suspension was then allowed to undergo reaction under heating at a temperature of 110° C. for 2 hours. After completion of the reaction, the material was then filtered under heating to withdraw a solid content. The solid content was then thoroughly washed with decane and hexane until no free titanium compounds were detected in the wash liquid. The solid content was then dried under reduced pressure.

Polymerization

Into a 1.5-l stainless steel autoclave were charged 3.5 mg of the solid coomponent thus prepared, 5.4 mg of thexyltrimethoxysilane, and 91 mg of triethyl aluminum. To the material were then added 340 g of propylene and 0.03 g of hydrogen.

The autoclave was heated so that the internal temperature thereof was kept at 80° C. After 1 hour, the internal gas was then released to complete the polymerization. As a result, 122 g of a polypropylene powder was obtained. The product exhibited MFR of 1.8 g/10 min., Tmp of 165.0° C., XSRT of 1.40 %, and FM of 15,900 kg/cm$^2$.

COMPARATIVE EXAMPLES 5–6 AND EXAMPLES 10–12

Catalysts were prepared and polymerization was effected in the same manner as in Example 9 except that the kind and amount of the catalyst component (C) used were altered as shown in Table 3.

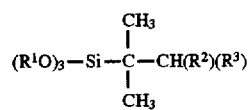

wherein R$^1$, R$^2$ and R$^3$ each represents a C$_{1-3}$ hydrocarbon group.

2. The process as in claim 1, wherein said olefin has 2 to 12 carbon atoms.

3. The process as in claim 2, wherein said olefin is propylene, or a mixture of propylene with ethylene or an α-olefin having 4 or more carbon atoms.

4. The process as in claim 3, wherein said polyolefin is a propylene polymer having a melting point of 164° C. or higher and a xylene-soluble content at room temperature of 2.0% or less.

5. The process as in claim 1, wherein said R$^1$, R$^2$ and R$^3$ each represents an alkyl group having 1 to 3 carbon atoms.

6. The process as in claim 1 wherein said component (C) is selected from the group consisting of thexyltrimethoxysilane, thexyltriethoxysilane, thexyltripropoxysilane, thexyltriisopropoxysilane, 2,3-dimethyl-2-trimethoxysilyl-pentane, 2,3-dimethyl-2-triethoxysilyl-pentane, 2,3-dimethyl-2-tripropoxysilylpentane, 2,3-dimethyl-2-triisopropoxysilyl-pentane, 2-methyl-3-ethyl-2-trimethoxysilyl-pentane, 2-methyl-3-ethyl-2-triethoxysilyl-pentane, 2-methyl-3-ethyl-2-tripropoxysilylpentane, 2-methyl-3-ethyl-2-triisopropoxysilyl-pentane, 2,3,4-trimethyl-2-trimethoxysilyl-pentane, 2,3,4-trimethyl-2-triethoxysilyl-

TABLE 3

| Example and Comparative Example | Component (C) | Used amount (mg) of Component (C) | Caralyst activity (g/g h) | XSRT (%) | Tmp (degree) | MFR (g/10 min) | FM (kg/cm$^2$) |
|---|---|---|---|---|---|---|---|
| Ex.10 | Thexyltrimethoxysilane | 2.7 | 37,200 | 1.4 | 165.0 | 3.5 | 15,800 |
| Ex.11 | Thexyltrimethoxysilane | 10.8 | 36,000 | 1.2 | 166.1 | 4.1 | 16,900 |
| Ex.12 | Thexyltrimethoxysilane | 16.2 | 35,800 | 1.1 | 165.9 | 1.6 | 16,300 |
| Comp.Ex.5 | t-Butyltrimethoxysilane | 14.8 | 16,500 | 1.5 | 163.6 | 1.8 | 16,200 |
| Comp.Ex.6 | Dicyclopentyldimethoxysilane | 17.2 | 20,300 | 1.7 | 163.4 | 2.2 | 15,100 |

As mentioned above, the process of the present invention can provide an olefin polymer having a high stereoregularity and an extremely high melting point in a remarkably high yield.

While the invention has been described in detail and with reference to specific embodiments thereof, it will be apparent to one skilled in the art that various changes and modifications can be made therein without departing from the spirit and scope thereof.

What is claimed is:

1. A process for producing a polyolefin, which comprises polymerizing an olefin in the presence of a catalyst comprising (A) a solid catalyst component containing titanium, magnesium and halogen prepared in the presence of an internal electron donor, (B) an organoaluminum compound, and (C) an organosilicon compound represented by formula (1):

pentane, 2,3,4-trimethyl-2-tripropoxysilylpentane, 2,3,4-trimethyl-2-triisopropoxysilyl-pentane, 2,3 -dimethyl-2-trimethoxysilyl-hexane, 2,3-dimethyl-2-triethoxysilyl-hexane, 2,3-dimethyl-2-tripropoxysilyl-hexane, 2,3-dimethyl-2-triisopropoxysilyl-hexane, 2,4-dimethyl-3-ethyl-2-trimethoxysilyl-pentane, 2,4-dimethyl-3-ethyl-2-triethoxysilyl-pentane, 2,4-dimethyl-3-ethyl-2-tripropoxysilyl-pentane, 2,4-dimethyl-3-ethyl-2-triisopropoxysilyl-pentane, 2,4-dimethyl-3-isopropyl-2-trimethoxysilyl-pentane, 2,4-dimethyl-3-isopropyl-2-triethoxysilyl-pentane, 2,4-dimethyl-3-isopropyl-2-propoxysilyl-pentane,-and 2,4-dimethyl-3-isopropyl-2-isopropoxysilyl-pentane.

7. The process as in claim 6, wherein said component (C) is thexyltrimethoxysilane.

8. The process as in claim 1, wherein said component (A) has a molar ratio of Mg/Ti of 0.1/1 to 1,000/1 and a molar ratio of halogen/Ti of 1/1 to 100/1.

9. The process as in claim 1, wherein said component (B) is an organoaluminum compound represented by formula (2), (3), (4), or (5);

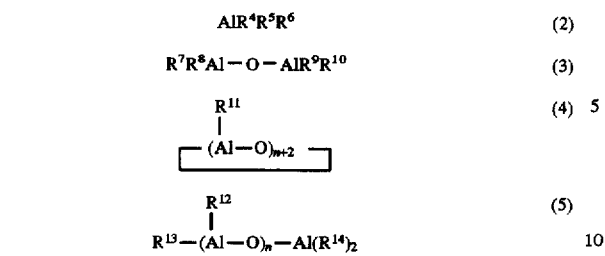

wherein $R^4$, $R^5$ and $R^6$, which may be the same or different, each represents a hydrogen, a halogen atom, or an alkyl group having up to 12 carbon atoms, provided that at least one of $R^4$, $R^5$ and $R^6$ is an alkyl group; $R^7$, $R^8$, $R^9$, $R^{10}$, $R^{11}$, $R^{12}$, $R^{13}$, and $R^{14}$, which may be the same or different, each represents an alkyl group having up to 12 carbon atoms and n represents an integer of 1 to 100.

10. The process as in claim 1, wherein the molar ratio of component (C) to component (B) is in the range of 0.001/1 to 5/1.

* * * * *